United States Patent
Kowalski et al.

(10) Patent No.: US 8,544,940 B2
(45) Date of Patent: Oct. 1, 2013

(54) REAR FLOOR FOR AN AUTOMOBILE AND AUTOMOBILE INCLUDING SUCH A FLOOR

(75) Inventors: Philippe Kowalski, Montigny le Bretonneux (FR); Anne Corbel-Hey, Versailles (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 13/321,400

(22) PCT Filed: Apr. 2, 2010

(86) PCT No.: PCT/FR2010/050633
§ 371 (c)(1),
(2), (4) Date: Jan. 13, 2012

(87) PCT Pub. No.: WO2010/133779
PCT Pub. Date: Nov. 25, 2010

(65) Prior Publication Data
US 2012/0098298 A1    Apr. 26, 2012

(30) Foreign Application Priority Data
May 20, 2009 (FR) .................................... 09 53367

(51) Int. Cl.
*B62D 25/20* (2006.01)
(52) U.S. Cl.
USPC ................. 296/193.07; 296/203.04; 296/1.03

(58) Field of Classification Search
USPC .................. 296/203.01–203.04, 204, 193.07, 296/184.1, 1.03; 52/798.1, 783.11
See application file for complete search history.

(56) References Cited

U.S. PATENT DOCUMENTS

| | | | | |
|---|---|---|---|---|
| 1,328,684 A | * | 1/1920 | Oehm | 105/406.1 |
| 2,199,377 A | * | 4/1940 | Tangerman | 72/333 |
| 2,217,110 A | * | 10/1940 | Gilpin | 52/783.11 |
| 3,481,643 A | * | 12/1969 | Campbell | 296/204 |
| 4,188,058 A | | 2/1980 | Resa et al. | |
| 4,974,895 A | * | 12/1990 | Davenport | 296/39.2 |
| 5,795,007 A | | 8/1998 | Yamamoto | |
| 6,053,566 A | * | 4/2000 | Aghssa et al. | 296/187.11 |
| 6,347,454 B1 | | 2/2002 | Jurica et al. | |

FOREIGN PATENT DOCUMENTS
EP    0 756 984    2/1997

OTHER PUBLICATIONS
International Search Report Issued Aug. 17, 2010 in PCT/FR10/050633 Filed Apr. 2, 2010.
French Search Report Issued Nov. 27, 2009 in French Patent Application No. 0953367 Filed May 20, 2009.

\* cited by examiner

*Primary Examiner* — Dennis Pedder
(74) *Attorney, Agent, or Firm* — Oblon, Spivak, McClelland, Maier & Neustadt, L.L.P.

(57) ABSTRACT

A rear floor for an automobile, including a series of ribs punched into the metal sheet of the floor and extending in the longitudinal direction of the vehicle. At least one of the punched-in ribs is connected to an adjacent rib by a rib portion that is inclined relative to the longitudinal direction.

14 Claims, 2 Drawing Sheets

REAR FLOOR FOR AN AUTOMOBILE AND AUTOMOBILE INCLUDING SUCH A FLOOR

Figure 1:
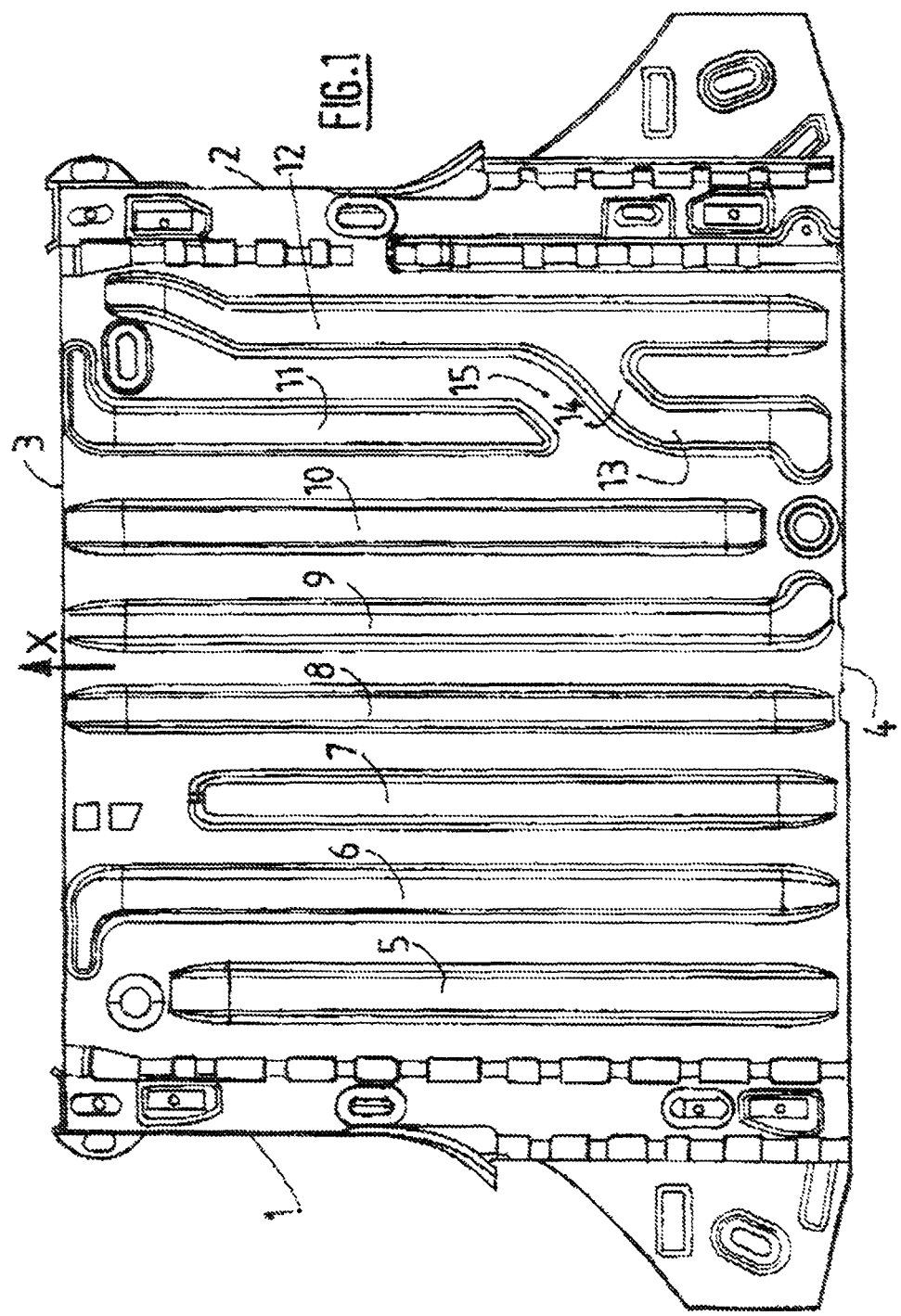

The present invention relates to a rear floor for a motor vehicle.

The rear floor is that part of the floor that extends under the luggage storage space.

This rear floor is made up of at least one metal sheet having pressed ribs running in the longitudinal direction of the vehicle to increase the bending and torsional strength of the rear floor.

The axis of the rear wheels is situated under the rear floor.

As the vehicle drives along, the wheels and the exhaust line transmit to the rear floor vibration waves that generate noise perceptible in the passenger compartment of the vehicle despite the sound-proofing lining covering the floor and the elastic mounts used to connect the wheel suspension components to the floor.

The longitudinal ribs of the floor make it possible to some extent to attenuate the vibrations but do not attenuate them sufficiently to meet the comfort criteria demanded by users.

It is an object of the present invention to address this disadvantage by creating a rear floor capable of effectively attenuating vibration waves transmitted to it as the vehicle is driving along.

This object is achieved, according to the invention, using a rear floor for a motor vehicle comprising a series of ribs pressed into the sheet metal of the floor, running in the longitudinal direction of the vehicle, characterized in that at least one of the pressed ribs is connected to an adjacent rib by a rib part that is inclined with respect to the longitudinal direction.

Tests carried out by the applicant company have indeed surprisingly demonstrated that by connecting at least one of the ribs to an adjacent rib via an inclined rib part, the vibrations transmitted by the rear floor as the vehicle is driving along are significantly attenuated.

This results in an appreciable reduction in the noise in the passenger compartment and in an increase in the level of comfort felt by the occupants.

Advantageously, said rib, said inclined rib part and said adjacent rib together form a Y.

In a preferred version of the invention, said inclined rib part and said adjacent rib are situated in a region near the rear edge of the rear floor, the opening of the two branches of the Y facing toward the rear edge of the floor.

In this version, said adjacent rib is situated in the continuation of another rib running parallel to said rib.

In another preferred version of the invention, said inclined rib part is connected to said rib in a region near the rear edge of the rear floor, the opening of the two branches of the Y facing toward the front edge of the floor.

According to other specifics of the invention:
said rib extends near a lateral edge of said rear floor;
said rib, said inclined rib part and said adjacent rib are situated in a region near the middle of the rear floor;
said ribs are uniformly spaced;
the distance between the ribs is more or less equal to the width of the ribs.

The invention also relates to a motor vehicle equipped with a rear floor according to the invention.

Other particulars and advantages of the invention will become even more apparent throughout the following description.

Figure 2:
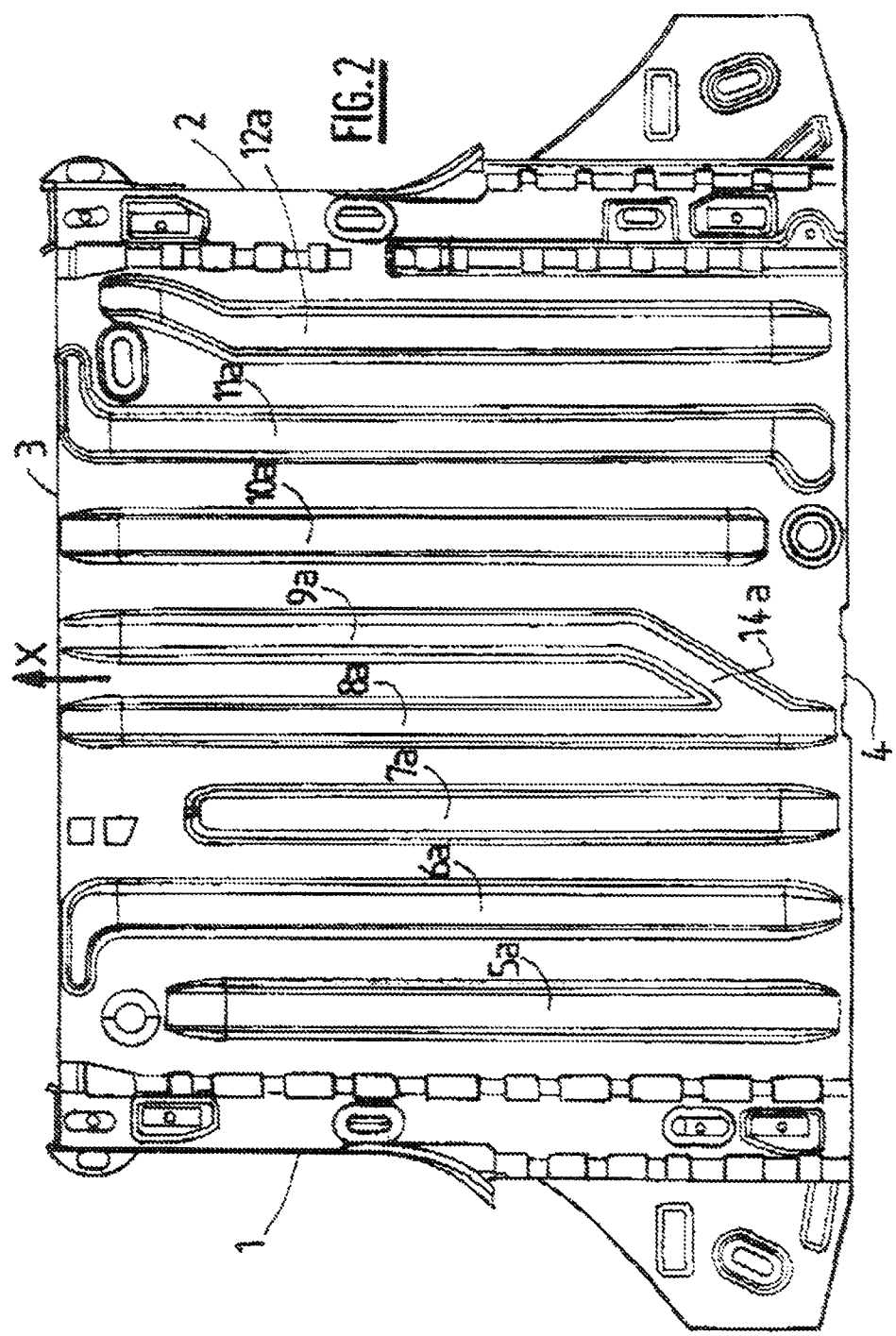

In the attached drawings, which are given by way of non-limiting examples:

FIG. 1 is a plan view of a first preferred version of a rear floor according to the invention, and FIG. 2 is a plan view of a second preferred version of a rear floor according to the invention.

The rear floors depicted in FIGS. 1 and 2 comprise two lateral edges 1, 2, a front edge 3 and a rear edge 4.

The front edge 3 is intended to be connected to a floor running under the passenger compartment of the vehicle and notably supporting seats for the occupants.

The lateral edges 1, 2 adopt the shape of the rear wheel arches.

Each of the rear floors comprises a series of pressed ribs 5, 6, 7, 8, 9, 10, 11, 12; 5a, 6a, 7a, 8a, 9a, 10a, 11a, 12a which run in the longitudinal direction X of the vehicle.

These ribs 5, 6, 7, 8, 9, 10, 11, 12; 5a, 6a, 7a, 8a, 9a, 10a, 11a, 12a give the rear floor good bending strength.

The rear floors depicted in FIGS. 1 and 2 are intended to be positioned just above the axis of the rear wheels and are therefore affected by the vibration waves generated as the vehicle drives along.

Thus, these rear floors usually transmit to the passenger compartment noise that can be perceived by the occupants as troublesome.

The rear floors have been selected following comparative testing for their ability to absorb the vibrations generated when a vehicle equipped with such floors is driving along.

These comparative tests were carried out on a test bed using sensors that measure the transmission of vibration waves in the longitudinal direction X, the transverse direction Y and the vertical direction Z of the vehicle.

These measurements made it possible to devise diagrams comprising, on the ordinate axis, the amplitude and on the abscissa axis, the frequency of the vibrations.

The frequency range was between 20 and 300 Hz.

The best results were obtained for the rear floor depicted in FIG. 1.

The amplitude-frequency diagram obtained revealed an aptitude to absorb frequencies at around 250 Hz.

Excellent results were also obtained in the case of the rear floor depicted in FIG. 2 which offers an advantage for frequencies close to 180 Hz.

In the two rear floors, one 12 (see FIG. 1) or 8a (see FIG. 2) of the pressed ribs is connected to an adjacent rib 13 or 9a via a rib part 14 or 14a which is inclined with respect to the longitudinal direction X.

In the case of the rear floor depicted in FIG. 1, the rib 12, the inclined rib part 14 and the rib 13 together form a Y when the floor is studied from front to rear, viewed from above. This Y thus has a more or less straight long branch formed by the rib 12 and a short branch formed by the adjacent rib 13 and the inclined rib part 14, the adjacent rib 13 being more or less parallel to the rib 12.

Moreover, the rib 13 adjacent to the rib 12 and forming the short branch of the Y is situated in the continuation of a rib 11 parallel to the rib 12.

The rib 11 is thus shorter than the rib 12 and is separated from the inclined rib part 14 by a space 15.

FIG. 1 also shows that the rib 12 that forms a Y with the short rib 13 is a rib which runs close to the lateral edge 2 of the rear floor.

In addition, the inclined rib part 14 and the short rib 13 are situated in a region close to the rear edge 4 of the rear floor. The opening of the two branches of the Y thus faces toward the rear edge 4 of the vehicle.

In the case of the rear floor depicted in FIG. 2, the two ribs 8a, 9a are connected to one another by a rib part 14a that is inclined with respect to the axis X.

This inclined rib part 14a is situated in a region close to the rear edge of the rear floor. The ribs 8a and 9a are thus connected on the side of their end, the common branch of the Y formed by the end of the rib 8a being very short by comparison with the previous embodiment, the two branches of the Y that are formed by the ribs 8a and 9a by contrast being very long. In this embodiment, the opening of the Y therefore faces toward the front edge 3 of the floor.

Moreover, the rib 8a, the adjacent rib 9a and the inclined rib part 14a are situated in a region near the middle of the rear floor.

FIGS. 1 and 2 also show that all the ribs 5 to 12 or 5a to 12a are uniformly spaced and that the distance between the ribs is more or less equal to the width of the ribs.

The number of ribs 5 to 12 or 5a to 12a is equal to 8, but can vary between 6 and 10 notably according to the width of the vehicle intended to be equipped with such a rear floor.

The advantages obtained with rear floors according to the invention can essentially be explained by the rib parts 14, 14a that connect two adjacent ribs.

Given that these rib parts 14, 14a are inclined with respect to the longitudinal axis X of the vehicle, their presence in the rear floor has no impact on the bending or torsional strength of the floor.

Of course, the invention is not restricted to the two examples that have just been described and numerous modifications can be made to these without departing from the scope of the invention.

Thus, the rear floor could comprise more than two ribs joined together by inclined rib parts such as the parts 14 and 14a.

Further, these two ribs that are joined together by inclined parts could be situated in regions other than those depicted in FIGS. 1 and 2.

It is also possible to combine the embodiments depicted in FIGS. 1 and 2.

The invention claimed is:

1. A rear floor for a motor vehicle comprising:
   a series of ribs pressed into the sheet metal of the floor, running in the longitudinal direction of the vehicle;
   wherein at least one of the pressed ribs is connected to an adjacent rib by a rib part that is inclined with respect to the longitudinal direction,
   wherein the adjacent rib is substantially parallel to the at least one of the pressed ribs, and
   wherein the at least one, adjacent, and inclined ribs open into each other.

2. The rear floor as claimed in claim 1, wherein the rib, the inclined rib part, and the adjacent rib together form a fork.

3. The rear floor as claimed in claim 2, wherein the inclined rib part and the adjacent rib are situated in a region near a rear edge of the rear floor, an opening of the two branches of the fork facing toward the rear edge of the floor.

4. The rear floor as claimed in claim 3, wherein the adjacent rib is situated in a continuation of another rib running parallel to the rib.

5. The rear floor as claimed in claim 2, wherein the inclined rib part is connected to the rib in a region near a rear edge of the rear floor, an opening of the two branches of the fork facing toward a front edge of the floor.

6. The rear floor as claimed in claim 1, wherein the rib extends near a lateral edge of the rear floor.

7. The rear floor as claimed in claim 1, wherein the rib, the inclined rib part, and the adjacent rib are situated in a region near a middle of the rear floor.

8. The rear floor as claimed in claim 1, wherein the ribs are uniformly spaced.

9. The rear floor as claimed in claim 1, wherein a distance between the ribs is more or less equal to the width of the ribs.

10. A motor vehicle comprising a rear floor as claimed in claim 1, installed in a passenger compartment of a motor vehicle.

11. The rear floor as claimed in claim 1, wherein another adjacent rib is separated from the inclined rib part by a space.

12. The rear floor as claimed in claim 1, wherein another adjacent rib is in continuation with the adjacent rib.

13. The rear floor as claimed in claim 3, wherein the floor is configured to absorb frequencies of substantially 250 Hz.

14. The rear floor as claimed in claim 5, wherein the floor is configured to absorb frequencies of substantially 180 Hz.

* * * * *